June 6, 1950          A. S. BRUNJES          2,510,548
MULTIPLE EFFECT DISTILLATION
Filed June 20, 1947
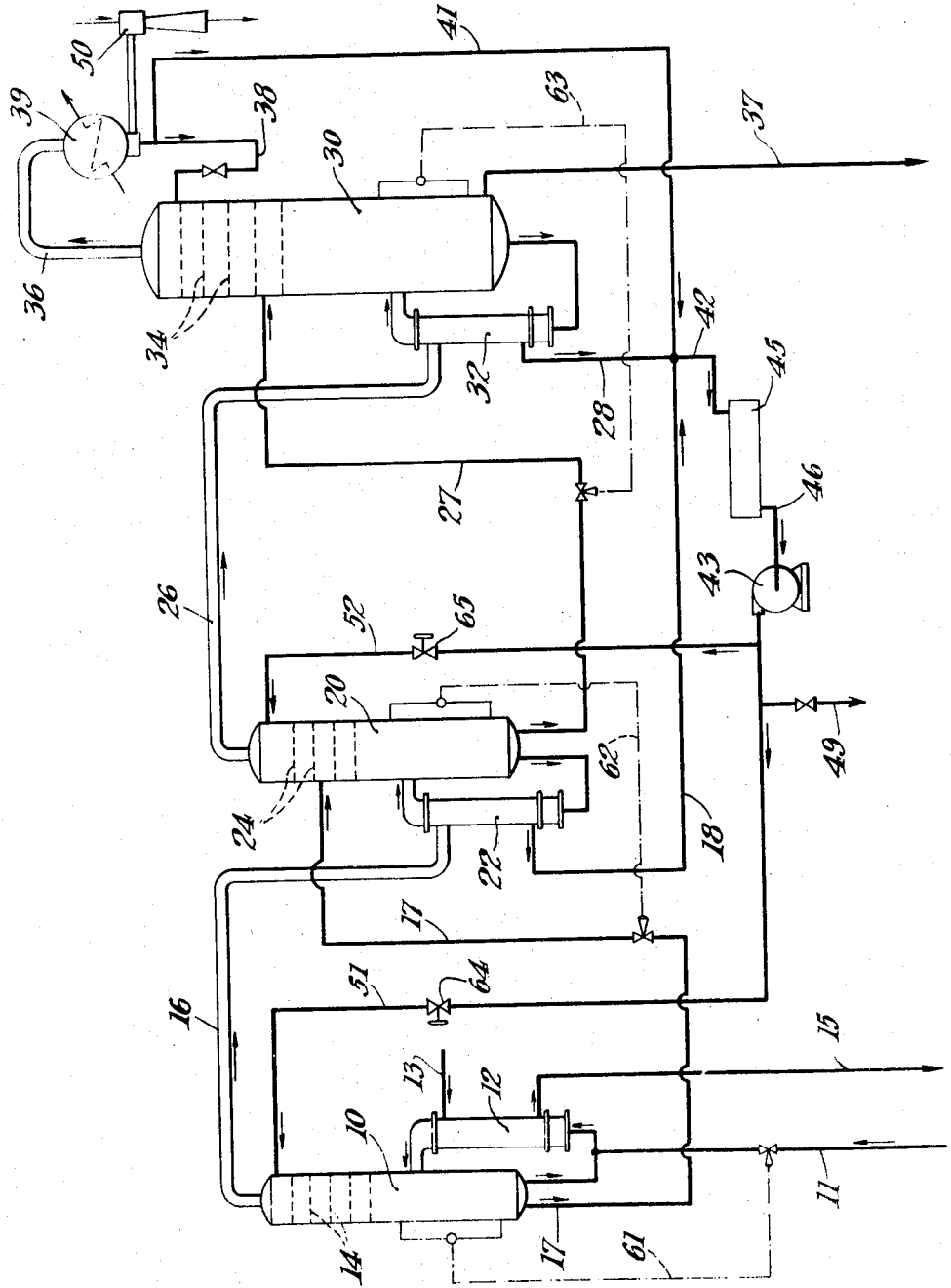
INVENTOR.
Austin S. Brunjes
BY Nathaniel Ely
ATTORNEY Patented June 6, 1950

2,510,548

UNITED STATES PATENT OFFICE 2,510,548

MULTIPLE-EFFECT DISTILLATION

Austin S. Brunjes, Plandome, N. Y., assignor to The Lummus Company, New York, N. Y., a corporation of Delaware Application June 20, 1947, Serial No. 756,015

4 Claims. (Cl. 202—40)

This invention relates to distillation and more particularly, to the concentration of dilute solutions in multiple-effect distillation systems wherein the concentrated solution is withdrawn as bottoms product.

In concentrating dilute solutions of such materials as the glycols and glycerols the temperature of the solution must be kept as low as is practicable to prevent decomposition of these relatively heat sensitive materials. Accordingly, when concentrating by distillation, the distillation is usually effected under a vacuum. Because of the resultant large vapor volume at low pressures, however, a column of a large diameter is necessary and since the latent heat of the solvent at pressures less than atmospheric is much greater, a correspondingly greater amount of heat is required to effect the concentration. The net result is that the cost of the distillation apparatus is large and the heat economy of the system is low.

It has been the practice, therefore, to use multiple-effect evaporators in concentrating such solutions mainly because of their high heat economy. However, the multiple-effect evaporator is not very efficient in such practice for a substantial portion of the desired product is passed overhead with the solvent as it leaves the evaporator unit due to the relatively high vapor pressure of the product in solution. For instance, in a typical evaporator system for concentrating ethylene glycol, the overhead stream from any one evaporator unit may contain up to 2% of the valuable glycol. This represents a substantial loss in product when it is considered that the usual feed to such a system contains only about 10% of glycol.

To eliminate this loss of product while at the same time maintaining the heat economy of the multiple-effect evaporator, a multiple-effect distillation system is proposed wherein the well-known evaporator principles are applied to distillation. In principle, my invention involves boiling a liquor comprising a solution of a solvent and a solute or mixture of solutes at successively decreasing pressures by passing the solvent vapors as a heat transfer medium at a higher pressure in indirect heat exchange relation with the liquor in a plurality of interrelated fractionating or distillation zones. More specifically, the solution to be concentrated is first separated into a vapor or solvent component and a liquor or more concentrated solution at one pressure and then that vapor is used to boil that liquor at a lower pressure, thereby separating the liquor into a second vapor and liquor which are thereafter treated as in the first stage but at correspondingly lower pressures, the vapors in each stage being condensed and returned in a novel reflux system. In a system as proposed, the overhead solvent vapors will contain no more than a trace of the solute at any time.

It is, therefore the principal object of my invention to provide a distillation system especially adapted to concentrating dilute solutions.

It is a more specific object of my invention to provide a multiple-effect distillation system wherein a solvent is removed overhead in each effect as a heat transfer medium and the solute is removed as bottom to be passed at successively decreasing pressures in indirect heat exchange relation with the solvent from the preceding effect.

It is a further object of my invention to provide in such a multiple-effect distillation system a means of supplying reflux to each column.

Further objects and advantages of my invention will be apparent from the following disclosure taken in conjunction with the accompanying drawing in which I have shown a triple-effect distillation system especially adapted for the purposes of my invention. While only three stages are shown in the drawing it will be apparent that more or less may be used depending on the nature and composition of the feed to the system.

Referring now to the drawing, the solution to be concentrated is charged to the column 10 through the line 11 either onto one of the plates 14 or, as shown, to the return line of the reboiler 12. This first column is operated at a pressure which is, generally speaking, a function of the design of the entire system and the allowable temperature level in the third column. In other words, the system is balanced with respect to both the vapor and liquid components. By means of high pressure steam entering the reboiler bundle through the line 13 the feed is vaporized and the vapors are then returned to the column below the plates 14, the steam condensate being removed from the reboiler through line 15. The ascending vapors passing countercurrently to the reflux returned on the top plate of column 10 as hereinafter described, are passed overhead through line 16 to the reboiler 22 of column 20, and the partially concentrated liquor or net bottoms in column 10 is drawn off through line 17 as feed for the column 20.

In column 20, which is operated at a lower pressure than column 10 to utilize the relatively high temperature level of the vapors from that column, the liquor fed through line 17 is again fractionated. The heat required is supplied, as mentioned above, by condensation of the overhead vapors from column 10 in the reboiler 22, the condensate being withdrawn through line 18 to make up a part of the reflux requirements of the system as will be shown below. The vapors returned to the column 20 from reboiler 22 pass upwardly through the reflux descending on plates 24 and then overhead through line 26 to the reboiler 32 of the column 30. The bottoms liquor is withdrawn from column 20 through line 27 and passed to tower 30 which is operated at a still lower pressure, usually below atmospheric.

As before, the liquor is concentrated furin this last stage. The overhead vapors from column 20 passing through line 26 are condensed in reboiler 32 to supply the heat required for the operation of column 30, the condensed vapors being removed through line 28. The feed liquor entering in line 27 is fractionated as before, the vapors passing through the reflux on plates 34 and thence through overhead line 36. The concentrated product liquor may be withdrawn from column 30 through line 37. This last stage is operated so that the overhead is condensed separately in an overhead condenser 39 and a part of the condensed liquid is returned through valved-line 38, as reflux for the column 30. The remainder of the condensed overhead is passed to the sweet water sump 45 by way of lines 41 and 42. The steam jet 50 leading from condenser 39 supplies the necessary vacuum in this last stage.

The condensate or sweet water in lines 18, 29 and 41 is passed to the sweet water sump 45 through line 42. The reflux requirements of columns 10 and 20 are withdrawn from the sump through line 46 by pump 43 and thereafter distributed as required through lines 51 and 52 to columns 10 and 20 respectively. Line 51 is fitted with a control valve 64 to control the flow of reflux to the column 10 and control valve 65 in line 52 serves the same function for tower 20. The excess sweet water accumulated in the system may be withdrawn through the valved line 49.

Three level controls are shown to provide the necessary balance of the liquid components in the system. Level control 61 controls the input rate to the column 10; control 62, the input to column 20; and control 63, to column 30. This is a balanced system with respect to the vapors, also, in that all of the vapors from the preceding stage are condensed in the next succeeding stage so that at no point is there an accumulation of vapors.

As an example of the operation of this invention consider the concentration of a dilute aqueous solution of ethylene glycol containing some impurities such as di-glycol and inorganic salts. For this operation three stages are sufficient to concentrate a 10% solution to a product having a concentration of about 90% glycol with no more than a trace of glycol found in the sweet water at any point in the reflux system. The three columns 10, 20 and 30 are operated at 40 pounds per square inch gauge, atmospheric pressure, and 72 mm. Hg. absolute, respectively. Since the decomposition temperature of glycol is relatively low, i. e., 323.6 to 327.2° F., the temperature in any one of the effects must be kept as low as practicable. By operating at the above mentioned pressures the highest temperature should be in the bottom of column 10 and this will be found to be about 295° F. The maximum temperature in tower 20 will be about 260° F. and in tower 30 about 212° F. With a feed containing about 10% glycol entering tower 10 the liquor entering tower 20 will have about 16% glycol, that entering tower 30 will have about 34% so that a final product containing about 90% glycol may be withdrawn through line 37. The sweet water has a glycol concentration of about .001% to .003% at the most which is practically negligible.

While I have discussed a specific application of my invention to a dilute glycol solution, it is obvious that this same method and apparatus may be used in any other process where it is desired to concentrate a solution at varying pressures with maximum savings in steam consumption. Practically, of course, this invention would be limited in its application to those situations where it is economically feasible, typical of which is the concentration of dilute glycerol solutions.

While I have shown and described a preferred form of embodiment of my invention, I am aware that modifications may be made thereto and I, therefore, desire a broad interpretation of my invention within the scope and spirit of the description herein and the claims appended hereinafter.

I claim:

1. A method of concentrating a dilute aqueous solution of a polyhydric alcohol to recover a substantially pure bottoms product without exceeding the temperature of decomposition thereof, which comprises rectifying the dilute solution in the presence of a reflux at superatmospheric temperature and pressure in a first zone, passing the partially concentrated solution from the lower part of the first zone to the upper part of an intermediate zone, maintaining the pressure in the intermediate zone lower than the pressure in the first zone, subjecting said partially concentrated solution to rectification in the presence of reflux in the upper part of the intermediate zone, collecting the further concentrated solution in the lower part of the intermediate zone, passing the vapor overhead from the first zone in indirect heat exchange with the solution in the lower part of the intermediate zone under conditions to strip water vapor therefrom and condense the vapors from the first zone, and thereafter passing the further concentrated solution from the lower part of the intermediate zone to the upper part of a final zone, subjecting said further concentrated solution to rectification in the presence of reflux in said final zone under temperature and subatmospheric pressure conditions to further remove water therefrom, collecting a still further concentrated solution at the lower part of the final zone, passing the overhead vapors from the upper part of the intermediate zone in indirect heat exchange relation to the still further concentrated solution collected in the bottom of the final zone to condense said vapors and further strip water vapors from said solution, and removing the substantially water free solution from the lower part of the final zone.

2. The method as claimed in claim 1 in which the substantially polyhydric alcohol-free water from the upper part of the final zone is condensed and returned in part as reflux to the respective rectification steps.

3. The method as claimed in claim 1 in which the polyhydric alcohol is ethylene glycol.

4. The method as claimed in claim 1 in which the polyhydric alcohol is glycerol.

AUSTIN S. BRUNJES.

REFERENCES CITED

The following references are of record in the file of this patent:

UNITED STATES PATENTS

| Number | Name | Date |
|---|---|---|
| 1,885,166 | Wurster | Nov. 1, 1932 |
| 2,126,974 | Reich | Aug. 16, 1938 |
| 2,152,164 | Wentworth | Mar. 28, 1939 |

FOREIGN PATENTS

| Number | Country | Date |
|---|---|---|
| 801,200 | France | May 16, 1935 |
| 564,876 | Germany | Nov. 24, 1932 |
| 107,599 | Great Britain | June 20, 1918 |